US012662022B2

(12) United States Patent
Gropp et al.

(10) Patent No.: US 12,662,022 B2
(45) Date of Patent: Jun. 23, 2026

(54) ADJUSTMENT APPARATUS FOR LONGITUDINAL ADJUSTMENT OF A VEHICLE FUNCTIONAL ASSEMBLY

(71) Applicant: BROSE FAHRZEUGTEILE SE & CO. KOMMANDITGESELLSCHAFT, COBURG, Coburg (DE)

(72) Inventors: Joerg Gropp, Böhlen (DE); Sergej Kostin, Coburg (DE)

(73) Assignee: BROSE FAHRZEUGTEILE SE & CO. KOMMANDITGESELLSCHAFT, COBURG, Coburg (DE)

( * ) Notice: Subject to any disclaimer, the term of this patent is extended or adjusted under 35 U.S.C. 154(b) by 167 days.

(21) Appl. No.: 18/261,079

(22) PCT Filed: Jan. 14, 2022

(86) PCT No.: PCT/EP2022/050718
§ 371 (c)(1),
(2) Date: Jul. 11, 2023

(87) PCT Pub. No.: WO2022/157076
PCT Pub. Date: Jul. 28, 2022

(65) Prior Publication Data
US 2024/0067053 A1     Feb. 29, 2024

(30) Foreign Application Priority Data
Jan. 19, 2021     (DE) .................... 10 2021 200 455.5

(51) Int. Cl.
*B60N 2/02*          (2006.01)
*B60N 2/07*          (2006.01)

(52) U.S. Cl.
CPC ......... *B60N 2/0264* (2023.08); *B60N 2/0705* (2013.01)

(58) Field of Classification Search
CPC ... B60R 16/027; B60R 16/0215; H01B 11/00; H01B 11/006; H02G 3/0475
See application file for complete search history.

(56) References Cited

U.S. PATENT DOCUMENTS 5,950,978  A      9/1999  Eguchi et al.
7,452,019  B1     11/2008  Day
                  (Continued)

FOREIGN PATENT DOCUMENTS

DE       102015215592 A1     2/2017
DE       102017208113 A1     11/2017
                  (Continued)

OTHER PUBLICATIONS

ISA European Patent Office, International Search Report Issued in Application No. PCT/EP2022/050718, Apr. 4, 2022, WIPO, 4 pages.

(Continued)

*Primary Examiner* — Paresh Paghadal
(74) *Attorney, Agent, or Firm* — McCoy Russell LLP

(57)          ABSTRACT

An adjustment apparatus for longitudinal adjustment of a vehicle functional assembly comprises a guide rail which extends along a longitudinal axis, an adjusting assembly which can be adjusted on the guide rail along the longitudinal axis and is assigned to the vehicle functional assembly, and a cable assembly. It is provided here that the guide rail has a first supporting portion which extends along the longitudinal axis and a second supporting portion which extends along the longitudinal axis, wherein, as viewed along a transverse direction transversely with respect to the longitudinal axis, the first supporting portion is arranged on (Continued)

a first side of a portion of the adjusting assembly and the second supporting portion is arranged on a second side of the portion of the adjusting assembly, and the cable assembly is supported with a first portion on the first supporting portion and with a second portion on the second supporting portion.

12 Claims, 10 Drawing Sheets

(56) References Cited

U.S. PATENT DOCUMENTS

| | | | |
|---|---|---|---|
| 12,071,044 B2 | 8/2024 | Zhao et al. | |
| 2006/0185879 A1* | 8/2006 | Kayumi | B60N 2/206 |
| | | | 174/50 |
| 2009/0020331 A1* | 1/2009 | Tsubaki | B60R 16/0207 |
| | | | 174/72 A |
| 2009/0298326 A1 | 12/2009 | Van Der Mee et al. | |
| 2010/0101360 A1* | 4/2010 | Tokumitsu | B25J 9/023 |
| | | | 901/29 |
| 2012/0024564 A1* | 2/2012 | Sekino | B60N 2/0715 |
| | | | 174/68.3 |
| 2012/0245464 A1 | 9/2012 | Tran | |
| 2017/0334314 A1 | 11/2017 | Takada | |
| 2018/0257220 A1* | 9/2018 | Bartsch | B25J 19/0029 |
| 2018/0334054 A1 | 11/2018 | Higuchi et al. | |
| 2019/0389331 A1 | 12/2019 | Schukalski et al. | |
| 2020/0207241 A1 | 7/2020 | Moulin et al. | |
| 2020/0215999 A1* | 7/2020 | Yamamoto | H02G 3/0475 |
| 2020/0361372 A1 | 11/2020 | Kominato et al. | |
| 2021/0151966 A1* | 5/2021 | Yamamoto | H02G 3/0475 |
| 2021/0252997 A1 | 8/2021 | Gropp et al. | |
| 2021/0394646 A1 | 12/2021 | Meguro et al. | |
| 2022/0024355 A1 | 1/2022 | Napau et al. | |
| 2022/0080862 A1 | 3/2022 | Simms et al. | |
| 2022/0219569 A1 | 7/2022 | Zhao et al. | |

| | | | |
|---|---|---|---|
| 2023/0062149 A1 | 3/2023 | Zhao et al. | |
| 2023/0294564 A1 | 9/2023 | Zhao et al. | |
| 2023/0294565 A1 | 9/2023 | Li et al. | |
| 2024/0300385 A1* | 9/2024 | Kieser-Neumeyer | |
| | | | B60N 2/0264 |

FOREIGN PATENT DOCUMENTS

| | | |
|---|---|---|
| DE | 102016224512 A1 | 6/2018 |
| DE | 102016224878 A1 | 6/2018 |
| DE | 102018210033 A1 | 12/2019 |
| DE | 112018003695 T5 | 3/2020 |
| DE | 102018219266 A1 | 5/2020 |
| EP | 1571034 A2 | 9/2005 |
| EP | 1783875 A1 | 5/2007 |
| EP | 2128022 B1 | 11/2012 |
| EP | 2128922 B1 | 11/2012 |
| FR | 2931455 A1 | 11/2009 |
| JP | 2017206102 A | 11/2017 |
| JP | 2020010515 A | 1/2020 |
| KR | 20100033583 A | 3/2010 |
| KR | 20190042232 A | 4/2019 |
| WO | 2018207589 A1 | 11/2018 |
| WO | 2020090575 A1 | 5/2020 |
| WO | 2020140659 A1 | 7/2020 |
| WO | 2020186259 A1 | 9/2020 |

OTHER PUBLICATIONS

United States Patent and Trademark Office, Non-Final Office Action Issued in U.S. Appl. No. 18/260,432, filed Apr. 14, 2025, 22 pages.

China National intellectual Property Administration, Office Action and Search Report Issued in Application No. 202280009169.6, Nov. 12, 2025, 15 pages. (Submitted with Partial Translation).

China National Intellectual Property Administration, Office Action and Search Report Issued in Application No. 202280009053.2, Nov. 14, 2025, 17 pages. (Submitted with Partial Translation).

\* cited by examiner

ADJUSTMENT APPARATUS FOR LONGITUDINAL ADJUSTMENT OF A VEHICLE FUNCTIONAL ASSEMBLY

CROSS REFERENCE TO RELATED APPLICATIONS

The present application is a U.S. National Phase of International Application No. PCT/EP2022/050718 entitled "ADJUSTING DEVICE FOR LONGITUDINAL ADJUST-ING OF A VEHICLE FUNCTIONAL MODULE," and filed on Jan. 14, 2022. International Application No. PCT/EP2022/050718 claims priority to German Patent Application No. 10 2021 200 455.5 filed on Jan. 19, 2021. The entire contents of each of the above-listed applications are hereby incorporated by reference for all purposes.

BACKGROUND

The disclosure relates to an adjustment apparatus for longitudinal adjustment of a vehicle functional assembly.

An adjustment apparatus of this kind comprises a guide rail which extends along a longitudinal axis, an adjusting assembly which can be adjusted on the guide rail along the longitudinal axis and is assigned to the vehicle functional assembly, and a cable assembly.

Such a vehicle functional assembly may for example be a vehicle seat. However, such a vehicle functional assembly may also be another functional module, for example be a console element, in particular in a vehicle passenger compartment.

In a conventional vehicle, a vehicle functional assembly, for example in the form of a vehicle seat can be adjusted relative to a vehicle floor, forming a floor portion, by means of a longitudinal adjustment apparatus, as is known for example from DE 10 2015 215 592 A1. In this case, guide rails extend in parallel with one another, on both sides of the vehicle seat, in order to shift the vehicle seat forwards or backwards in the vehicle and in this way to set a comfortable position for a vehicle occupant.

Conventional guide rails are designed so as to be comparatively short, for example shorter than 50 cm, in order to be able to adjust the vehicle functional assembly between a front position and a rear position. However, in conjunction with new vehicle technologies, in particular in conjunction with autonomous driving, it may be desirable to design an adjustment range for a vehicle functional assembly so as to be significantly larger, in order to be able to shift a vehicle functional assembly for example far back, in a vehicle. For this purpose, it is envisaged to use significantly longer guide rails, in particular of a length of greater than 50 cm, which in turn are to be arranged fixedly in the vehicle.

Guide rails for longitudinal adjustment of a vehicle functional assembly are typically arranged above a vehicle floor and are thus visible from the interior of the vehicle. Typically, a drive motor of a drive device is furthermore arranged in the region of the vehicle functional assembly and results in a limitation of installation space in a footwell below the vehicle functional assembly. A drive motor of this kind is typically designed to also travel along, and is correspondingly moved together with the vehicle functional assembly, upon movement of the vehicle functional assembly for longitudinal adjustment along the guide rails.

Furthermore, a cable assembly also requires installation space, by means of which cable assembly for example adjusting components of the vehicle functional assembly are supplied with electricity. In particular in the case of guide rails which allow an adjusting movement of a vehicle functional assembly over a longer adjustment path, a cable assembly is to be designed in such a way that the cable assembly can also be moved conjointly in the case of an adjusting movement of the vehicle functional assembly, but in this case the available installation space, for example below a vehicle functional assembly, is not unduly restricted.

WO 2020/186259 A1 discloses a longitudinal adjustment apparatus for a vehicle functional assembly, in which a guide rail arrangement is arranged on a vehicle floor. An upper guide rail can be moved towards a lower guide rail, by means of an adjusting transmission in the form of a belt drive, in order to thereby adjust the vehicle functional assembly longitudinally.

U.S. Pat. No. 5,950,978 discloses a vehicle seat in which a lower guide rail is received in a recess of a vehicle floor, such that an upper side of the lower guide rail is flush with an upper surface portion of the vehicle floor. The vehicle seat is guided in the guide rail and can be adjusted longitudinally via a drive device.

US 2012/0024564 A1 discloses a vehicle seat comprising a cable assembly which is received in a stowage device. The cable assembly can be removed from the stowage device in the event of adjustment of an adjusting assembly on a guide rail. In this case, the cable assembly is connected to the adjusting assembly via an end associated with the adjusting assembly.

WO 2018/207589 A1 further discloses a vehicle seat comprising a cable assembly which is received in a stowage device.

SUMMARY

The object underlying the proposed solution is to provide an adjustment apparatus for adjusting a vehicle functional assembly, which allows for an arrangement that is favorable in terms of installation space, using a cable assembly.

This object is achieved by a device having features as described herein.

According thereto, the guide rail comprises a first supporting portion which extends along the longitudinal axis and a second supporting portion which extends along the longitudinal axis, wherein, as viewed along a transverse direction transversely to the longitudinal axis, the first supporting portion is arranged on a first side of a portion of the adjusting assembly and the second supporting portion is arranged on a second side of the portion of the adjusting assembly, and the cable assembly is supported with a first portion on the first supporting portion and with a second portion on the second supporting portion.

The cable assembly can serve for example for the electrical supply of a drive device for driving an adjusting movement of the adjusting assembly relative to the guide rail. Alternatively or in addition, the cable assembly can also provide an electrical connection for the vehicle functional assembly, in that for example one end of the cable assembly is connected to one or more electrical components of the vehicle functional assembly, and the components can thus be connected, via the cable assembly, to an electrical energy supply system of the vehicle, for example.

In the adjustment apparatus, the cable assembly is arranged in a defined positional relationship with respect to the guide rail and is supported on the guide rail. For this purpose, the guide rail forms supporting portions on which the cable assembly rests in a sliding manner for example, such that the cable assembly is guided on the guide rail in the event of an adjusting movement of the adjusting assembly.

In this case, a first portion of the cable assembly is supported on a first supporting portion of the guide rail. In contrast, a second portion of the cable assembly rests on a second supporting portion of the guide rail. The adjusting assembly is movable longitudinally, between the supporting portions, such that the first portion of the cable assembly is arranged on a first side of the adjusting assembly, and the second portion is arranged on a second side of the adjusting assembly facing away from the first side.

Since the cable assembly is arranged on the guide rail, an arrangement that is favorable in terms of installation space is made possible. In particular, a region on the guide rail can be used for accommodating the cable assembly, such that installation space can be used efficiently and in particular conjoint movement of the cable assembly in the case of an adjusting movement of the adjusting assembly can be made possible.

Viewed along a transverse direction transversely to the longitudinal axis, the first supporting portion is arranged on a first side of a portion of the adjusting assembly and the second supporting portion is arranged on a second side of the portion of the adjusting assembly. The supporting portions are thus arranged on both sides of the adjusting assembly, for example on both sides of rail legs of a guide rail of the adjusting assembly. In this case, the supporting portions can be in contact with the adjusting assembly, for example with the rail legs of the guide rail of the adjusting assembly, and thus be movable in a sliding manner along the adjusting assembly. The supporting portions can, however, also be spaced apart from the adjusting assembly, in particular the rail legs of the guide rail of the adjusting assembly, along the transverse direction, without any contact occurring. Alternatively, however, there may be sliding, guiding contact.

In one embodiment, the cable assembly comprises an electric cable and a deformable cable support device that extends along the cable. The electric cable can comprise one or more line leads, and can for example serve for connecting the drive device of the adjustment apparatus or another electrical component of the vehicle functional assembly to an energy supply system of the vehicle. The cable support device can for example be formed by a chain comprising a plurality of mutually spaced chain links, and receives the cable in such a way that the cable is supported and a flexible mobility of the cable is restricted on the basis of the defined movability of the cable support device.

As an example, the cable support device can, for example when the cable support device is configured as a chain, be deformable exclusively in a movement plane, which is defined by the hinged connection of the chain links. The cable support device thus allows deformation of the cable in the movement plane, but prevents deformation out of this plane.

In one embodiment the cable support device forms the first portion and the second portion. The cable support device surrounding the cable is thus supported on the supporting portions of the guide rail in such a way that the first portion comes to rest on the first supporting portion, and the second portion comes to rest on the second supporting portion. The portions of the cable support device can for example be guided in a sliding manner on the supporting portions, such that the cable support device is supported on the supporting portions.

In one embodiment, the first portion and the second portion of the cable assembly are connected to one another via a curvature portion. The curvature portion provides for example a deflection about 180° and extends between the first portion and the second portion. The first portion can extend in a straight line on the first supporting portion. In contrast, the second portion extends in a straight line on the second supporting portion. For example, in this case the first portion and the second portion extend substantially in parallel with one another, along the longitudinal axis, on the supporting portions. The portions are connected to one another via the curvature portion.

For example, the curvature portion extends substantially transversely to the longitudinal axis and intersects with a spindle that is connected to the guide rail.

In one embodiment, the length of the first portion and the length of the second portion change relative to one another when the adjusting assembly is adjusted. The first portion can for example be fixed by one end to the guide rail. In contrast, the second portion is arranged at one end for example on the adjusting assembly. If the adjusting assembly is moved relative to the guide rail, then the cable assembly is deformed, wherein the first portion and the second portion change in length in each case, and thus compensate an adjusting movement of the adjusting assembly, with deformation of the cable assembly. During adjustment of the adjusting assembly, a sum of the lengths of the first portion and of the second portion preferably remains the same, however.

For example, the first portion is connected to a plug connector which is arranged stationary relative to the first supporting portion. For example, an electrical connection to an energy supply system of the vehicle can be established via the plug connector.

In contrast, the second portion is advantageously connected to the adjusting assembly, and is thus moved together with the adjusting assembly when the adjusting assembly is adjusted. During the movement, a deformation occurs on the cable assembly, and thus a change in length of the first portion and the second portion relative to one another.

In one embodiment, the cable assembly comprises a tensioning device for providing a resilient tension relative to the guide rail. The tensioning device can for example provide a resilient preload between the cable assembly and the guide rail, which causes adjustment of the cable assembly, upon adjustment of the adjusting assembly, in a defined manner, relative to the guide rail. The tensioning device can in particular engage on the curvature portion that interconnects the first portion and the second portion, wherein the preload can act for example longitudinally along the longitudinal axis, such that the curvature portion is loaded in the case of an adjustment of the adjusting assembly, for example longitudinally in the direction of an end of the guide rail. Depending on the direction of the adjusting movement of the adjusting assembly, the tensioning device can in this case be tensioned or relaxed, such that a deformation of the cable assembly takes place in one adjustment direction counter to the tension provided by the tensioning device, and in the other adjustment direction in the direction of the tension, and thus assisted by the tension.

Such a tensioning device can for example be formed by a resilient spring or a rubber band, or the like. The tensioning device can for example engage on a carriage element, which is guided on the guide rail for example and on which the curvature portion of the cable assembly is arranged in such a way that the cable assembly is deflected and guided in a sliding manner at the carriage element.

In one embodiment, the guide rail comprises a base, a first leg extending from the base, and a second leg extending from the base. The first supporting portion is formed on the first leg, and/or the second supporting portion is formed on the second leg. For example, the supporting portions can extend substantially in parallel, but spaced apart in a height direction relative to the base, and are thus formed on an edge of the respectively associated leg that is remote from the base.

The height direction is oriented perpendicularly to the longitudinal axis and corresponds at least approximately to the vehicle vertical direction. The supporting portions are spaced apart relative to the base, in particular along the height direction, in particular are formed above the base.

In one embodiment, the first portion rests, along the height direction, on the first supporting portion, and the second supporting portion rests, along the height direction, on the second supporting portion. The supporting portions each provide, for example, a sliding surface, which extends along a plane oriented perpendicularly with respect to the height direction. Along the height direction, the supporting portions provide a support for the cable assembly, such that the cable assembly is guided in a sliding manner on the supporting portions.

In one embodiment, the adjustment apparatus comprises a guide device, which serves for lateral guidance of the cable assembly on the guide rail. The guide device can for example comprise a guide element which is associated with a supporting portion, and which protrudes beyond the associated supporting portion, along the height direction. Advantageously, in each case a guide element is arranged laterally on the guide rail, such that each supporting portion is associated with a guide element and guidance is provided, via the associated guide element, in the region of each supporting portion. Since the guide element protrudes beyond the respectively associated supporting portion, along the height direction, the guide element provides guidance and support along a transverse direction oriented transversely to the height direction and transversely to the longitudinal axis, such that the cable assembly cannot slide off the guide rail, in particular laterally (along the transverse direction), and thus a guide channel for a defined adjusting movement of the cable assembly is formed between the guide elements.

In one embodiment the supporting portions are arranged at the same height relative to the base, viewed along the height direction. The supporting portions thus provide a support for the cable assembly, such that the portions of the cable assembly are guided at the same height and the cable assembly thus extends within a plane oriented perpendicularly with respect to the height direction.

In another embodiment, the first supporting portion is arranged at a first height relative to the base, and the second supporting portion is arranged at a second height, relative to the base, which is different from the first height. The supporting portions are thus located at different heights. As a result, the portions of the cable assembly are supported at different heights, and the cable assembly thus extends in a plane which is oriented obliquely with respect to the height direction. The oblique arrangement of the cable assembly makes it possible for available installation space to be used efficiently, wherein the support of the cable assembly can be adjusted, depending on the installation space available, in such a way that the cable assembly can be received on the guide rail in a space-saving manner.

In one embodiment, the adjustment apparatus comprises a drive device having a drive motor, an adjusting transmission and a transmission element that connects the drive motor to the adjusting transmission. The adjusting transmission can be driven by the drive motor for adjusting the adjusting assembly relative to the guide rail, such that the adjusting assembly is to be adjusted in an electromotive manner. The transmission element can be formed for example by a drive shaft, in particular a flexible drive shaft. The transmission element can, however, also assume the form of a sprocket, a worm or another transmission element, for example.

In one embodiment, the drive motor is electrically connected to the cable assembly. The cable assembly can thus provide an electrical supply for the drive motor.

In one embodiment, the adjusting transmission of the adjustment apparatus is formed by a spindle mechanism. A spindle mechanism of this kind comprises a spindle and can be actuated in order to bring about a longitudinal adjustment of the adjusting assembly relative to the guide rail. In this case, the spindle mechanism is operatively connected to the drive motor via the transmission element, such that the spindle mechanism moves, driven by the drive motor, and as a result the adjusting assembly can be adjusted relative to the guide rail.

In one embodiment, the adjusting transmission comprises a spindle connected to the guide rail, and a spindle nut that is operatively connected to the transmission element and is associated with the adjusting assembly. Rotating the spindle nut relative to the spindle makes it possible for the adjusting assembly to be adjusted relative to the guide rail.

A spindle nut of this kind in particular comprises an inner drillhole having a female thread formed therein, which is in threaded engagement with a male thread of the spindle. By Rotating the spindle nut relative to the spindle, the spindle nut rolls on the spindle and is thus moved longitudinally relative to the spindle. The spindle nut is axially secured on the adjustment assembly, for example by means of a gear housing of the adjusting transmission, such that in the event of longitudinal adjustment of the spindle nut relative to the spindle arranged stationary on the guide rail, the adjustment assembly is moved along on the guide rail.

In this case, the spindle nut is operatively connected to the transmission element. For example, a drive element, for example in the form of a driving worm, can be arranged on the transmission element (for example in the form of a drive shaft), which element is connected to the spindle nut. For example, the spindle nut can comprise an external toothing into which a worm toothing of the drive element engages in such a way that rotating the drive element causes the spindle nut to r otate and thus to move towards the spindle.

An assembly of a vehicle comprises an adjustment apparatus of the type described above, a floor assembly that is arranged stationary in the vehicle, and a floor portion. The floor portion, for example formed by vehicle floor, covered by a carpet, in the interior of the vehicle, is arranged above the floor assembly, wherein the guide rail and/or the cable assembly are arranged below the floor portion.

An interior of a vehicle is typically delimited downwards by a vehicle floor, which is covered for example by a carpet and serves as an area for users to place their feet on. In this case, the vehicle floor extends above the vehicle body structure, which constitutes the bearing framework of the vehicle and comprises beams or what are known as sills for forming a bearing structure for the vehicle.

In the present case, the guide rail of the adjustment apparatus is arranged below a floor portion (formed by the vehicle floor) and connected to a floor assembly, for example a bodywork structure. The guide rail thus extends below the floor portion of the vehicle floor, and is thus not directly visible from the interior of the vehicle.

In this case, a drive motor can be arranged, together with the guide rail, below the floor portion, and is thus movable below the floor portion, together with the cable assembly, in a space between the floor portion and the floor assembly.

However, in one embodiment the drive motor of the adjustment apparatus can also be arranged above the floor portion and is thus located above the guide rail, along the height direction corresponding to the vehicle vertical direction. An arrangement results in which the guide rail is hidden below the vehicle floor, while in contrast the drive motor is arranged above the vehicle floor, in the region of the vehicle functional assembly. The drive motor can be received in the region of the vehicle functional assembly in an installation space-saving manner, for example in the region of the adjusting assembly for connecting the vehicle functional assembly to the guide rail arranged below the vehicle floor, such that the drive motor is moved together with the adjusting assembly, upon adjustment of the adjusting assembly. This makes it possible for example to keep a footwell below the vehicle functional assembly free as far as possible, wherein the drive motor can be received for example in the region of a trim of the adjusting assembly.

Since the cable assembly extends below the floor portion, but for example an electrical supply for components of the vehicle functional assembly above the floor portion is intended to be provided by means of the cable assembly, the second portion of the cable assembly can, in one embodiment, for example be connected to a connection element which extends through an opening of the floor portion. The adjusting assembly is guided on the guide rail and extends for example through a slot-shaped opening of the floor portion, such that a vehicle functional assembly connected to the adjusting assembly can be moved above the floor portion by means of adjusting the adjusting assembly.

In this case, the connection element can also extend through the slot-shaped opening, in order to connect electrical components on the vehicle functional assembly side to the cable assembly below the floor portion. An (electrical) connection element of this kind comprises, for example, a plug connector to which a wiring harness can be connected on the side of the vehicle functional assembly, in order to thereby connect electrical components of the vehicle functional assembly to the cable assembly.

The adjustment apparatus can comprise two guide rails extending in parallel with one another, which serve for longitudinal guidance of the vehicle functional assembly, as is generally conventional in the case of vehicle functional assemblies in the form of vehicle seats for example. In this case, each guide rail is associated with an adjusting assembly for longitudinal adjustment of the respective adjusting assembly on the respective guide rail.

The opening of the floor portion in the vehicle floor can in particular extend in a slot-shaped manner, in parallel with the longitudinal axis. The floor portion can in particular be formed by a carpet or be covered by a carpet. In this case, the opening can be formed in the carpet and be provided for example by a slot extending longitudinally along the longitudinal axis.

BRIEF DESCRIPTION OF THE DRAWINGS

The idea underlying the solution will be explained in greater detail in the following, with reference to exemplary embodiments that are shown in the Figures.

DETAILED DESCRIPTION

Figure 1:
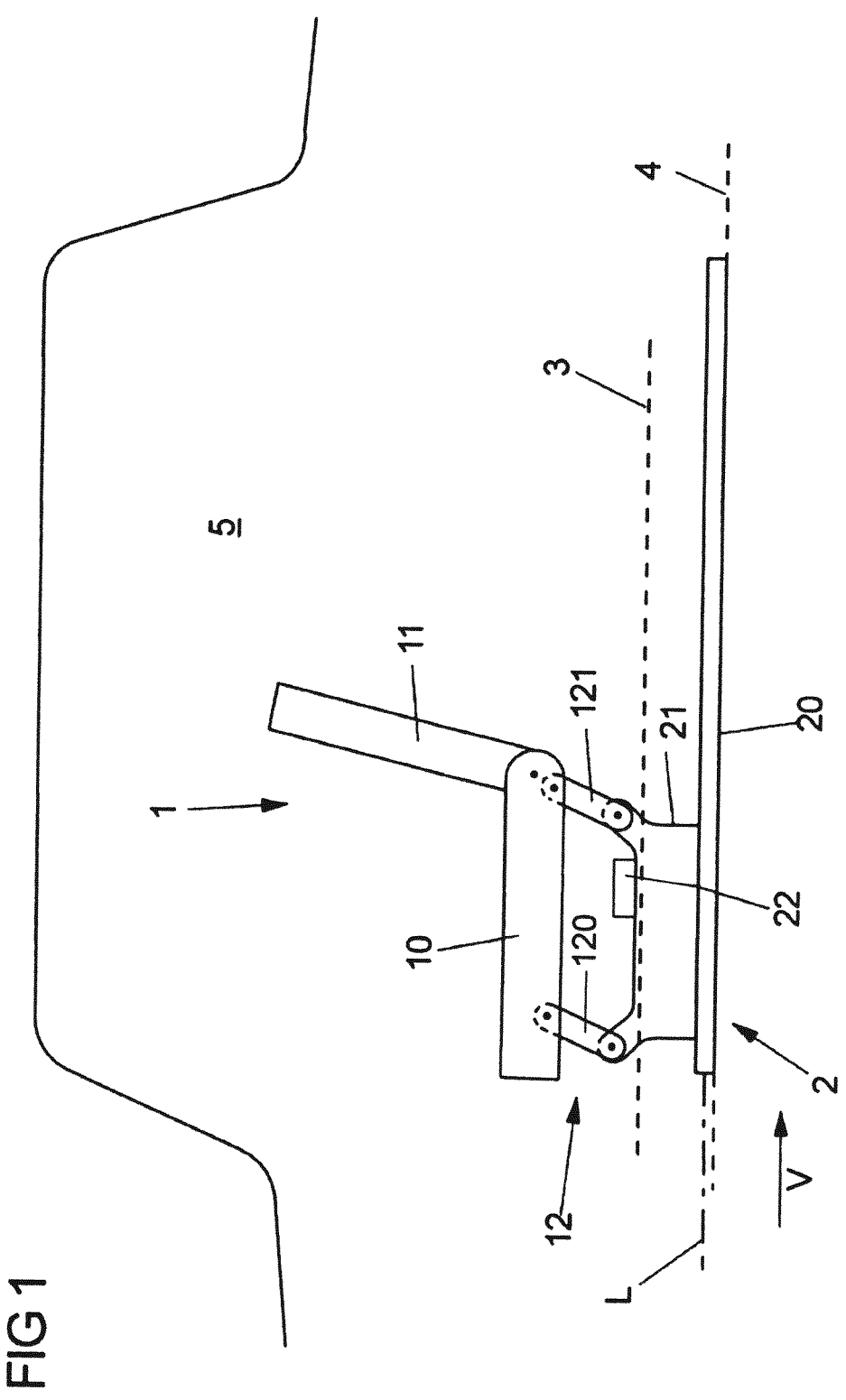
FIG. 1 is a schematic view of a vehicle functional assembly in the form of a vehicle seat on an arrangement of guide rails.

A vehicle functional assembly in the form of a vehicle seat 1, as is shown schematically in FIG. 1, comprises a seat part 10 and a backrest 11 arranged pivotably on the seat part 10. A vehicle seat 1 of this kind can for example be a vehicle front seat in the first seat row in a vehicle 5, but can also be designed as a vehicle back seat, for example in the second or third seat row.

The vehicle seat 1 is connected to an adjusting assembly 21 of a (longitudinal) adjustment apparatus 2 via a height adjustment apparatus 12. Within the context of the height adjustment apparatus 12, coupling elements 120, 121 in the form of swing arms that are pivotably connected both to the seat part 10 and to the adjusting assembly 21, are pivotable relative to the adjusting assembly 21 for the purpose of height adjustment of the vehicle seat 1, such that the seat part 10 can be raised or lowered for setting a comfortable sitting position for a vehicle occupant.

Figure 2:
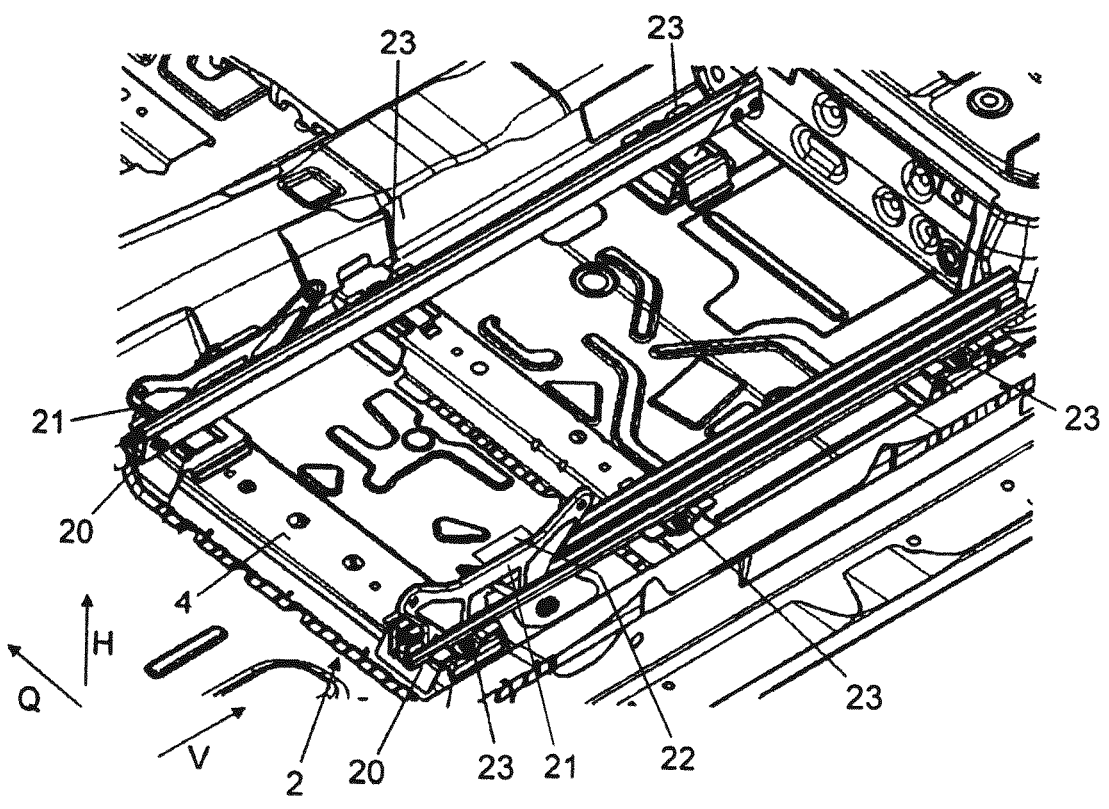
FIG. 2 is a view of an adjustment apparatus comprising two guide rails extending longitudinally on a floor assembly.
Figure 3:
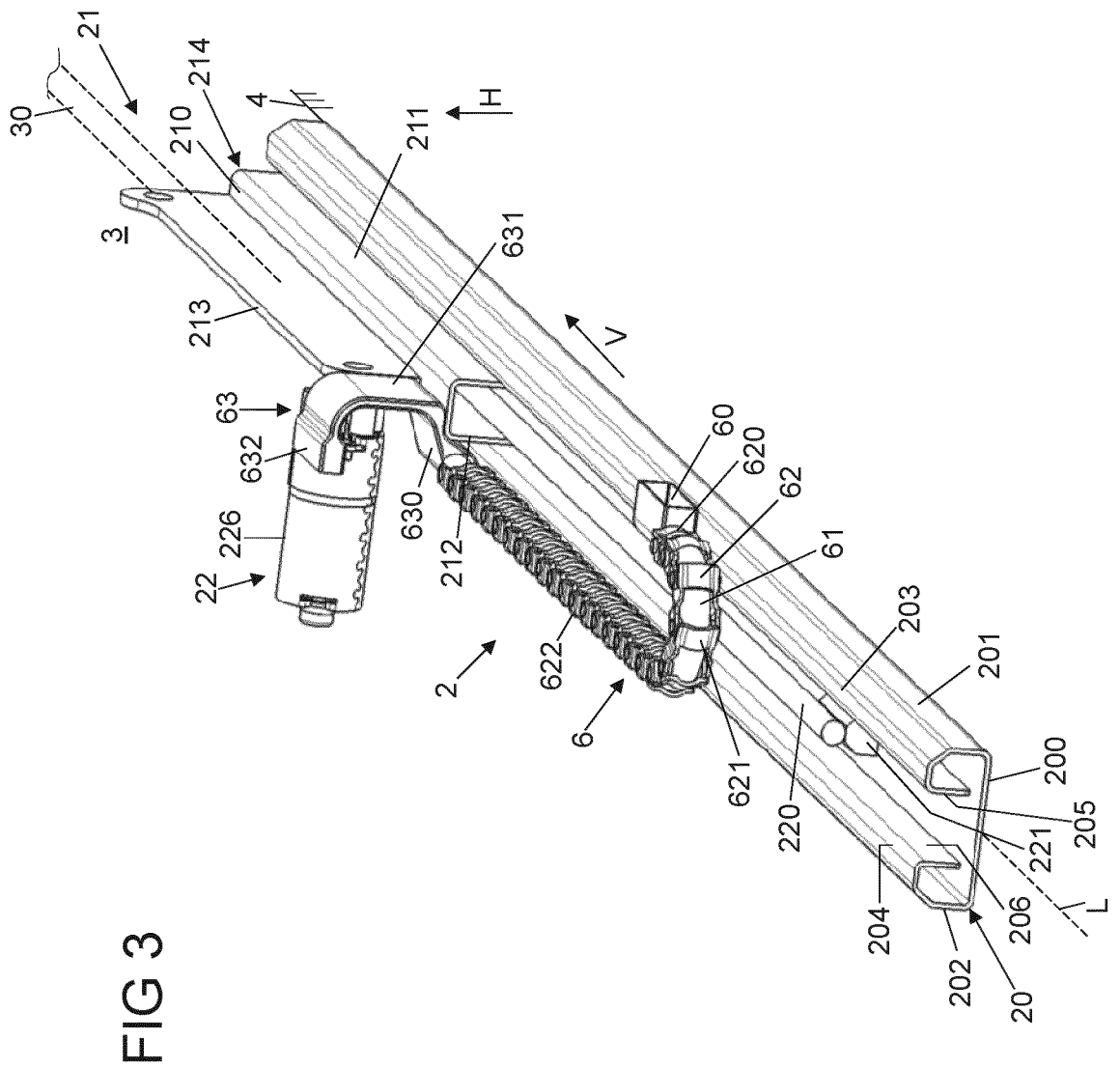
FIG. 3 is a view of an exemplary embodiment of an adjustment apparatus comprising a guide rail, an adjusting assembly that is adjustable relative to the guide rail, and a cable assembly.

The adjustment apparatus 2 comprises an arrangement of guide rails 20 extending in parallel, which—as is visible with reference to FIG. 2 which shows an exemplary embodiment of such guide rails 20—in each case extend along a longitudinal axis L and are rigidly connected to a floor assembly 4 of the vehicle 5 by means of connecting elements 23, and in each case guide an adjusting assembly 21 in a sliding manner along an adjustment direction V that is colinear to the longitudinal axis L. Via one electromotive drive device 22 in each case, implemented for example as a spindle drive comprising a spindle, the adjusting assemblies 21 can be adjusted on the guide rails 20, in order to in this way adjust a longitudinal position of the vehicle seat 1 along the adjustment direction V.

In the exemplary embodiment shown, the floor assembly 4, for example implemented by a sill of the vehicle body, is arranged below an actual vehicle floor 3 that is visible from the vehicle interior and is covered by a carpet. The guide rails 20 are thus not visible from the vehicle interior, when used as intended, but rather are hidden below the vehicle floor 3. Since the guide rails 20 are arranged below the actual vehicle floor 3 and thus hidden relative to the vehicle interior, the guide rails 20 do not impair the aesthetic impression in the vehicle interior.

In an exemplary embodiment of an adjustment apparatus 2, shown in FIGS. 3 to 6, a guide rail 20 extends longitudinally along a longitudinal axis L and provides a guide for an adjusting assembly 21 which comprises an adjustment rail 214 and an attachment part 213 that is arranged on said rail and extends from a base 210 of the adjustment rail 214 and is intended for connecting the adjusting assembly 21 to a vehicle functional assembly in the form of a vehicle seat 1 located thereabove. In a manner similar to that shown in FIG. 1, the guide rail 20 is arranged below the vehicle floor 3 and connected to a floor assembly 4. The adjustment rail 214 is displaceable below the floor portion 3 in a sliding manner along the longitudinal axis L to the guide rail 20, wherein the attachment part 213 extends through a slot opening 30 in the vehicle floor 3 and thus provides an attachment to the vehicle seat 1 above the floor 3.

Figure 4:
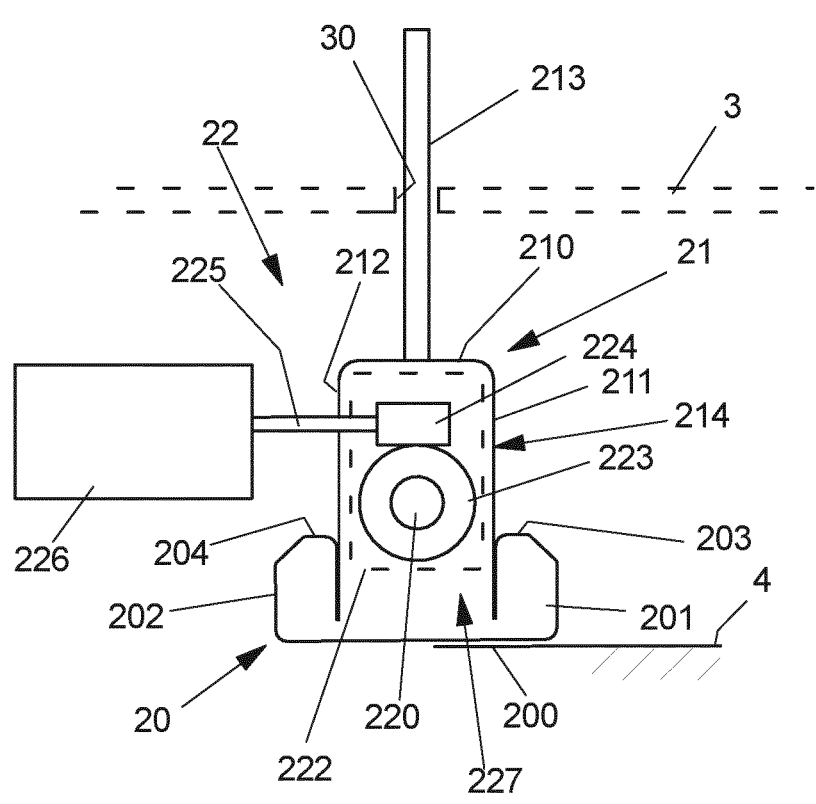
FIG. 4 is a schematic view of a drive device in the form of a spindle drive for adjusting the adjusting assembly.
Figures 5, 6:
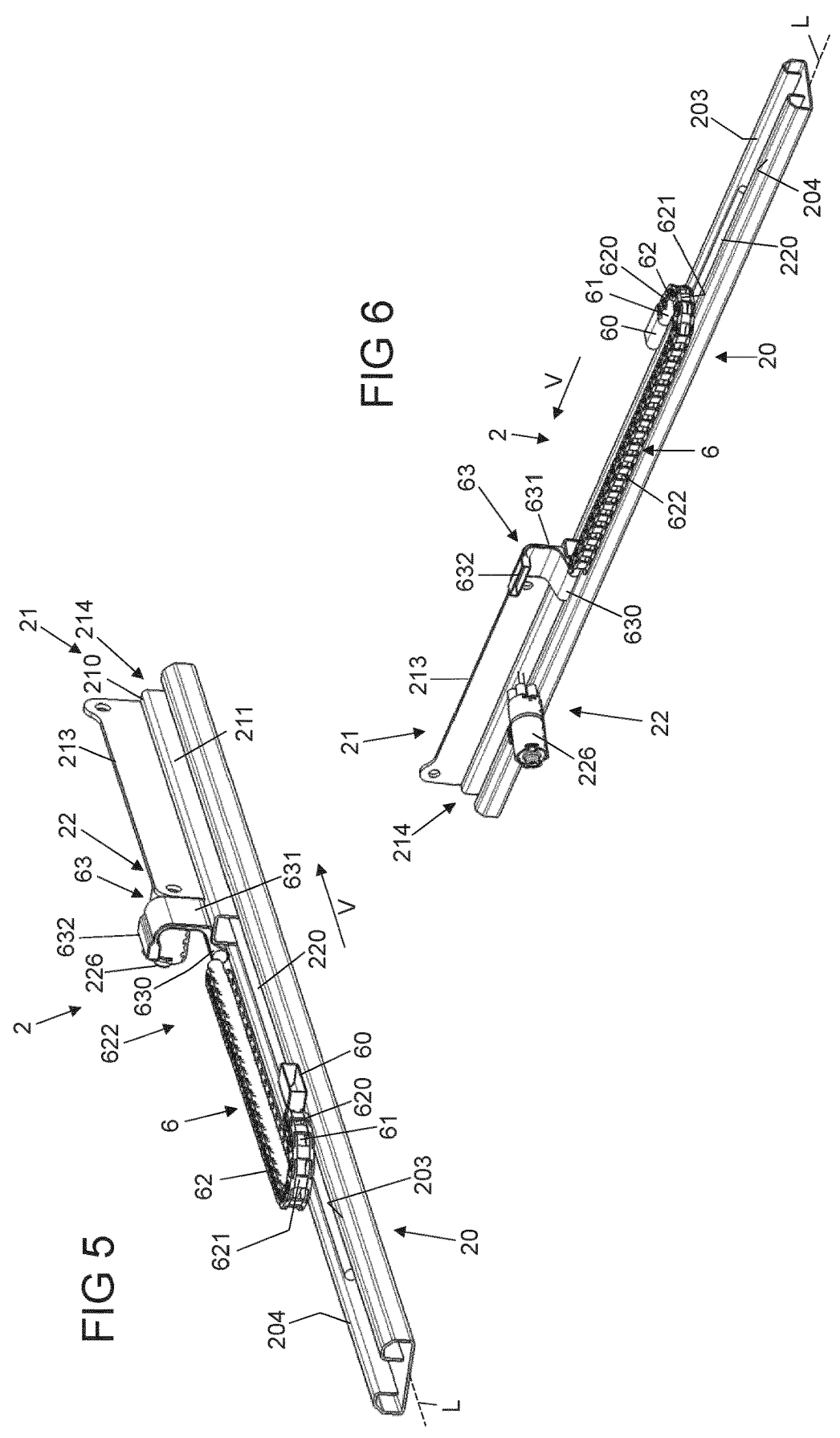
FIG. 5 is another view of the arrangement according to FIG. 3.
FIG. 6 is yet another perspective view of the arrangement according to FIG. 3.

In the exemplary embodiment shown the adjustment apparatus 2 comprises a drive device 22 which, as shown schematically in FIG. 4, comprises an electromotive drive motor 226 and an adjusting transmission 227 formed by a spindle mechanism. A spindle 220 is connected, via spindle retaining elements 221, in a stationary and co-rotatable manner, to a base 200 of the (associated) guide rail 20 that is arranged between legs 201, 202, and thus fixed relative to the guide rail 20. The adjusting transmission 227 is operatively connected to the spindle 220 in that a spindle nut 223 of the adjusting transmission 227 is in threaded engagement with an external thread of the spindle 220 via a female thread formed in an inner drillhole of the spindle nut 223. The spindle nut 223 is encased, together with a drive element 224 arranged on a drive shaft 225, in a gear housing 222 (shown in dashed lines in FIG. 3) that is connected to an adjustment rail 214 of the adjustment assembly 21, and thereby axially secured relative to the adjustment rail 214 of the adjustment assembly 21.

The drive motor 226 is coupled to the adjusting transmission 227 via a drive shaft 225. Driven by the drive motor 226, the transmission element, in the form of the drive shaft 225, for example formed by a flexible shaft, can be turned, as a result of which the drive element 224 is moved and thus the spindle nut 223 is rotated. During rotating, the spindle nut 223 rolls on the spindle 220 and is adjusted longitudinally on the spindle 220, due to the threaded engagement, which results in shifting of the adjustment assembly 21 on the guide rails 20.

The drive element 224 is implemented for example by a driving worm, which comprises a worm gear toothing and is engaged, via the worm gear toothing, with an external toothing of the spindle nut 223, in such a way that a rotational movement of the drive element 224 is converted into a rotational movement of the spindle nut 223.

In the exemplary embodiment shown, the drive motor 226 is arranged below the vehicle floor 3, and in this case is secured to the adjusting assembly 21 in such a way that, upon adjustment of the adjusting assembly 21, the drive motor 226 is adjusted together with the adjusting assembly 21.

In the exemplary embodiment shown in FIGS. 3 to 6, a cable assembly 6 is arranged on the guide rail 20 and extends on supporting portions 203, 204 which are formed on the legs 201, 202 of the guide rail 20. The supporting portions 203, 204 are, as can be seen for example from FIG. 3, bent inwards from the legs 201, 202 in such a way that the supporting portions 203, 204 extend longitudinally along the longitudinal axis L and in the process are oriented in parallel with the base 200. The supporting portions 203, 204 thus form contact surfaces on which the cable assembly 6 is supported in a sliding manner.

The adjustment rail 214 comprises rail legs 211, 212, on both sides of which the supporting portions 203, 204 extend longitudinally. In this case, the supporting portions 203, 204 can be in contact in a sliding manner with one of the rail legs 211, 212, respectively. However, it is also possible that there may be no direct contact, and the supporting portions 203, 204 thus do not slide on the rail legs 211, 212.

Inner surfaces 205, 206, formed by folding back, adjoin the supporting portions 203, 204, between which surfaces the adjustment rail 214 of the adjusting assembly 21 is received and guided.

In the exemplary embodiment shown, the cable assembly 6 comprises an electric cable 61 which is received in a cable support device 62 and guided through the cable support device 62. The cable support device 62 is configured as a chain, comprising a plurality of chain links connected to one another in an articulated manner, which are movable (exclusively), relative to one another, in a movement plane that is oriented perpendicularly to a height direction H that corresponds to the vehicle vertical direction.

The cable assembly 6 forms portions 620, 622 which extend longitudinally along the longitudinal axis L and in this case are supported on respectively associated supporting portions 203, 204 of the guide rail 20. A first portion 620 is connected to a plug connector 60 which is arranged stationary on the guide rail 20 and is secured for example to the supporting portion 203. In contrast, the portion 622 extends on the supporting portion 204 and is connected to a connection element 63 which is secured to the adjusting assembly 21.

The portions 620, 622, which each extend in a straight line along the associated supporting portion 203, 204, are connected to one another via a curvature portion 621, which provides a deflection about 180° between the portions 620, 622.

Figure 15A:
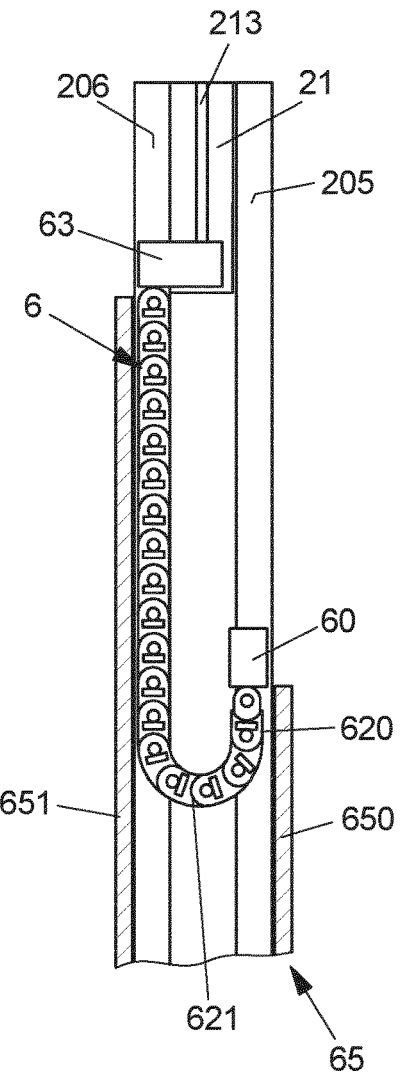
FIG. 15A is a schematic plan view of an adjustment apparatus, in a first position of an adjusting assembly relative to a guide rail.
Figure 15B:
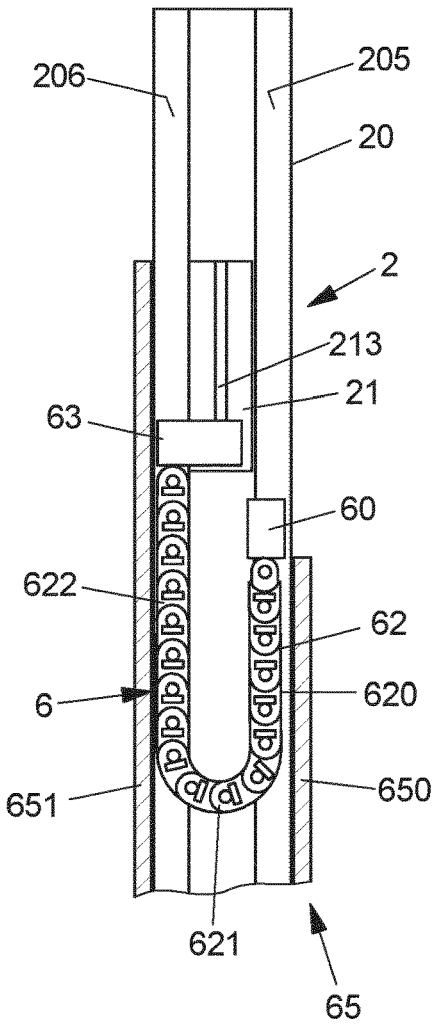
FIG. 15B is a plan view of the arrangement according to FIG. 15A, when the adjusting assembly has been adjusted out of the first position.

With reference now to FIGS. 15A, 15B, the cable assembly 6 is deformed during an adjusting movement of the adjusting assembly 21, in that the length of the portions 620, 622, measured along the longitudinal axis L, change relative to one another, as can be seen in the views according to FIGS. 15A, 15B. Thus, during an adjustment of the adjusting assembly 21, the position of the connection element 63 on the guide rail 20, and thus the position of the portion 622, changes. Since, in contrast, the plug connector 60 is secured to the guide rail 20 and thus the end of the portion 620 associated with the plug connector 60 remains stationary, the cable assembly 6 deforms in order to compensate the adjusting movement of the adjusting assembly 21, in that for example the length of the portion 620 is increased and the length of the portion 622 is decreased, as can be seen from the transition from FIG. 15A to FIG. 15B.

The connection element 63 is connected, at one end 630, to the portion 622, and secured on the adjustment rail 214.

11

Figures 7, 8:
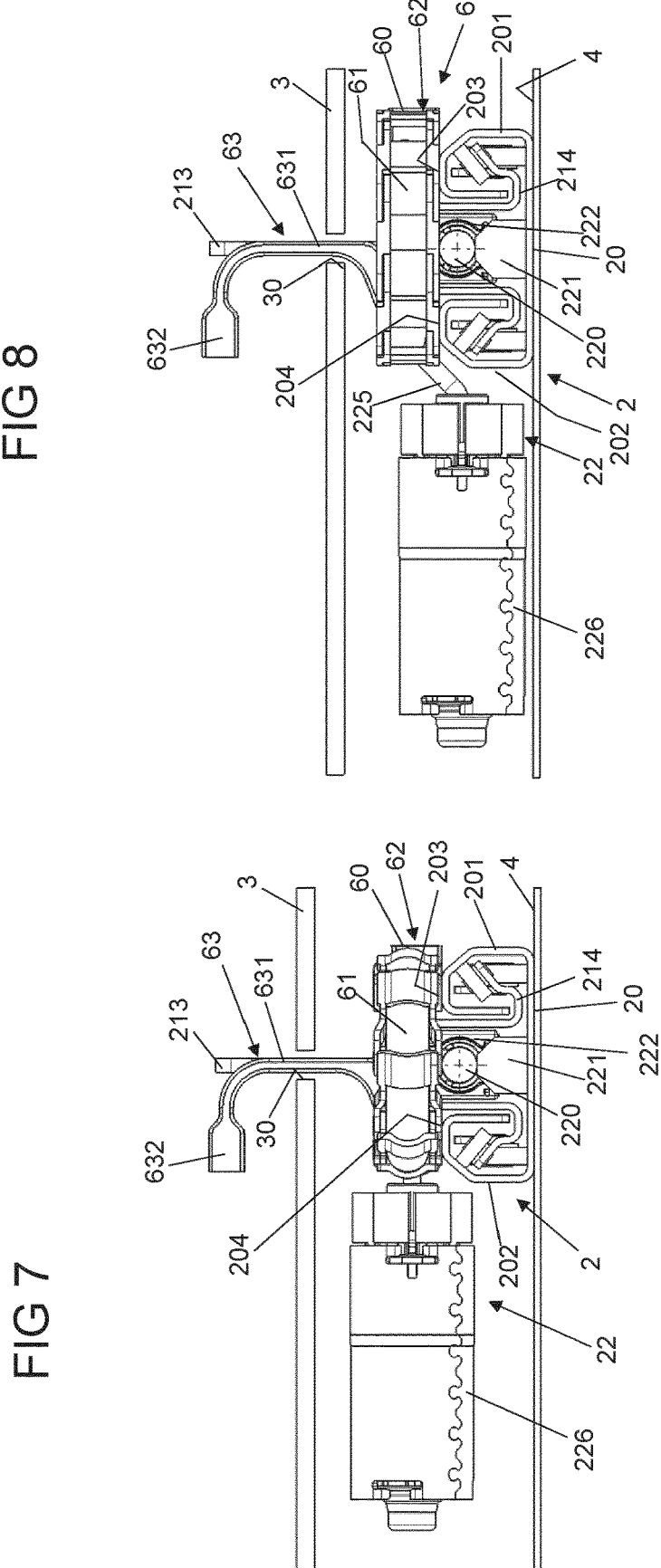
FIG. 7 is an end view of the arrangement according to FIG. 3, together with a floor assembly on which the guide rail is arranged, and a floor portion above the guide rail.
FIG. 8 is an end view of another embodiment having another arrangement of a drive motor.

In the case of a portion 631 extending perpendicularly along the height direction H, the connection element 63, as shown in FIG. 7, extends through the slot-shaped opening 30 in the vehicle floor 3, such that a plug connector 632 is located above the vehicle floor 3 and the connection element 63 is thus guided through the vehicle floor 3. In this case, the cable assembly 6 is preferably electrically connected to an electric line arrangement of the connection element 63, such that the plug connector 632 is electrically connected to the cable assembly 6 and thus an electrical supply, for example for electrical components of the vehicle seat 1 above the vehicle floor 3, can be provided.

In the case of the arrangement according to FIG. 7, the transmission element in the form of the drive shaft 225 extends in a straight line between the drive motor 226 and the adjusting transmission 227, inside the adjustment rail 214. In an exemplary embodiment shown in FIG. 8, the drive shaft 225 is curved with respect thereto, and the drive motor 226 is moved closer to the floor assembly 4. The height of the drive motor 226 is thus offset relative to the drive element 224 (see FIG. 4), which makes it possible to save on installation space. In particular, a vertical distance between the vehicle floor 3 and the floor assembly 4 can be reduced, as can be seen in a comparison of FIG. 7 and FIG. 8.

Otherwise, the exemplary embodiment according to FIG. 8 is functionally identical to the exemplary embodiment described above with reference to FIG. 3 to FIG. 6.

Figure 10:
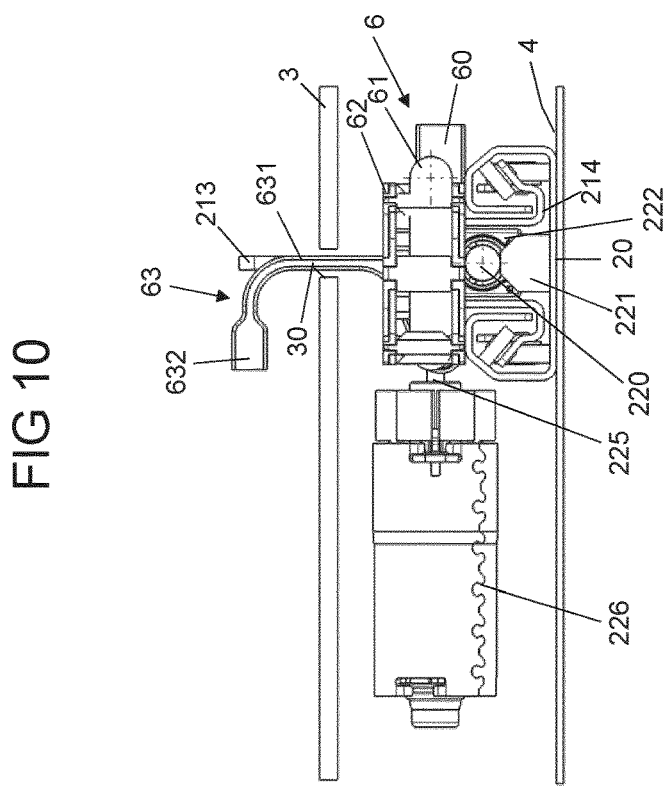
FIG. 10 is an end view of the adjustment apparatus according to FIG. 9.
Figure 9:
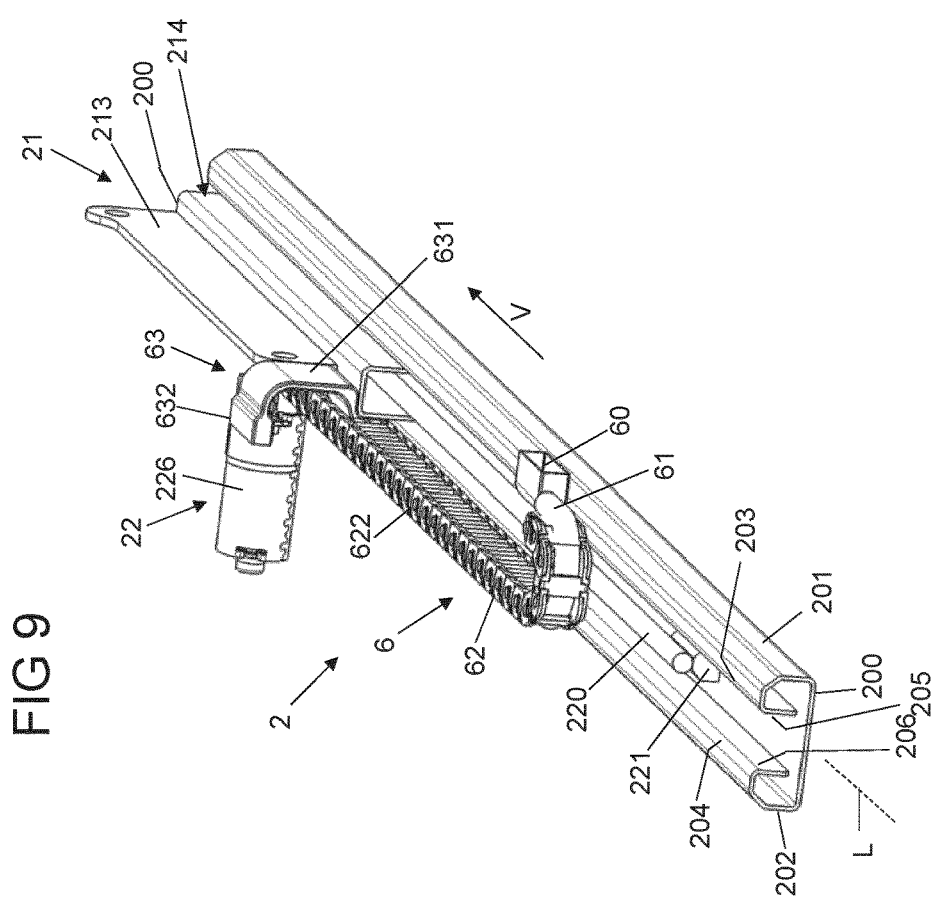
FIG. 9 is a view of another exemplary embodiment of an adjustment apparatus.

In the case of an exemplary embodiment shown in FIGS. 9 and 10, the cable assembly 6 is, in addition or alternatively to the electrical connection to the connection element 63, connected to the drive motor 226, which is arranged on the adjusting assembly 21 so as to travel along therewith. In this case, the cable assembly 6 thus provides an electrical supply for the drive motor 226 of the drive device 22.

Otherwise, the exemplary embodiment according to FIGS. 9 and 10 is identical to the exemplary embodiment described above with reference to FIG. 3 to FIG. 6, and therefore reference is to be made to the above explanations.

Figure 12:
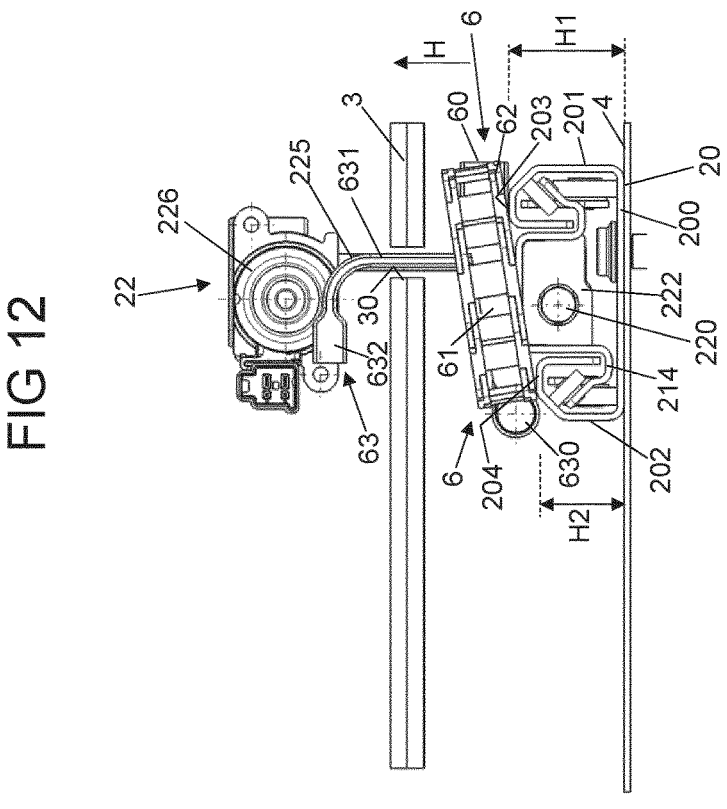
FIG. 12 is an end view of the arrangement according to FIG. 11.
Figure 11:
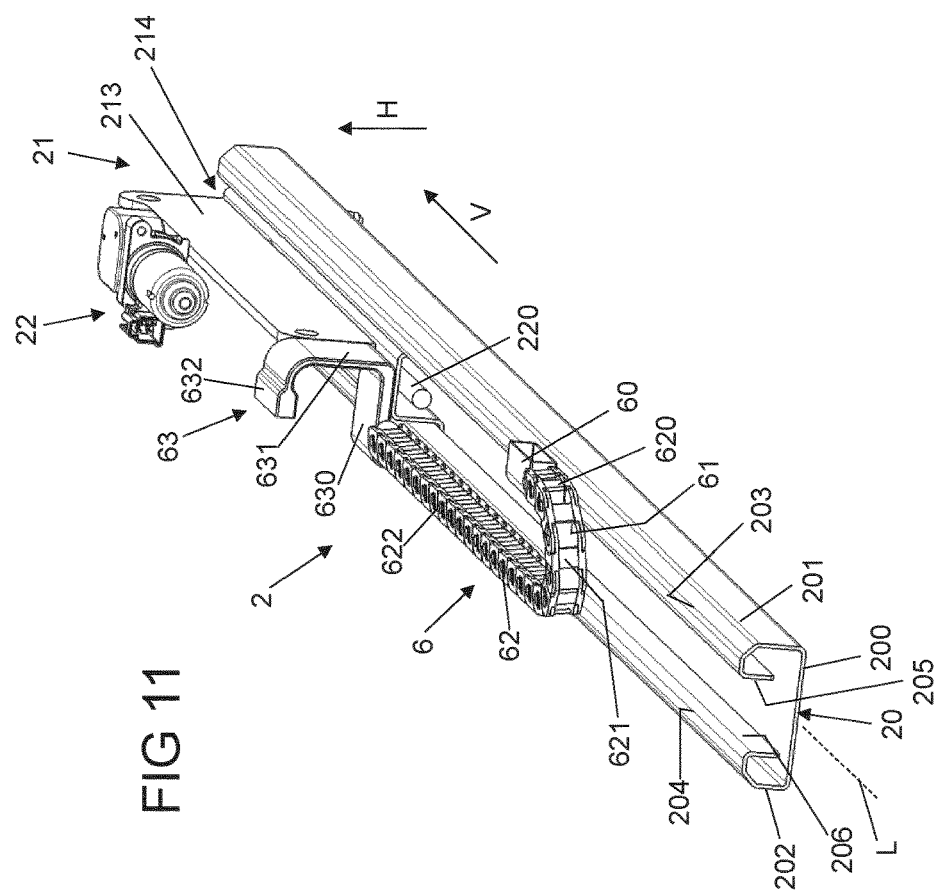
FIG. 11 is a view of yet another exemplary embodiment of an adjustment apparatus.

In an exemplary embodiment described in FIGS. 11 and 12, the guide rail 20 forms the supporting portions 203, 204 which are arranged at different heights H1, H2 relative to the floor assembly 4 and thus to the base 200 of the guide rail 20. Since the supporting portions 203, 204 are arranged at different heights H1, H2, the supporting portions 203, 204 provide a supporting guide for the cable assembly 6, which is oriented obliquely with respect to the height direction H, as can be taken from FIG. 12. This can make it possible to efficiently use an installation space provided below the vehicle floor 3, in that the position of the cable assembly 6 is adjusted to the conditions.

In the exemplary embodiment according to FIGS. 11 and 12, the drive motor 226 is arranged above the vehicle floor 3 and connected for example to the attachment part 213 of the adjusting assembly 21, as can be taken from FIGS. 11 and 12. In this case, the drive motor 226 is connected to an electrical energy supply system of the vehicle via the cable assembly 6 for example.

Otherwise, the exemplary embodiment according to FIGS. 11 and 12 is functionally identical to the exemplary embodiment described above with reference to FIG. 3 to FIG. 6, and therefore reference is again to be made to the above explanations.

Figures 13, 14:
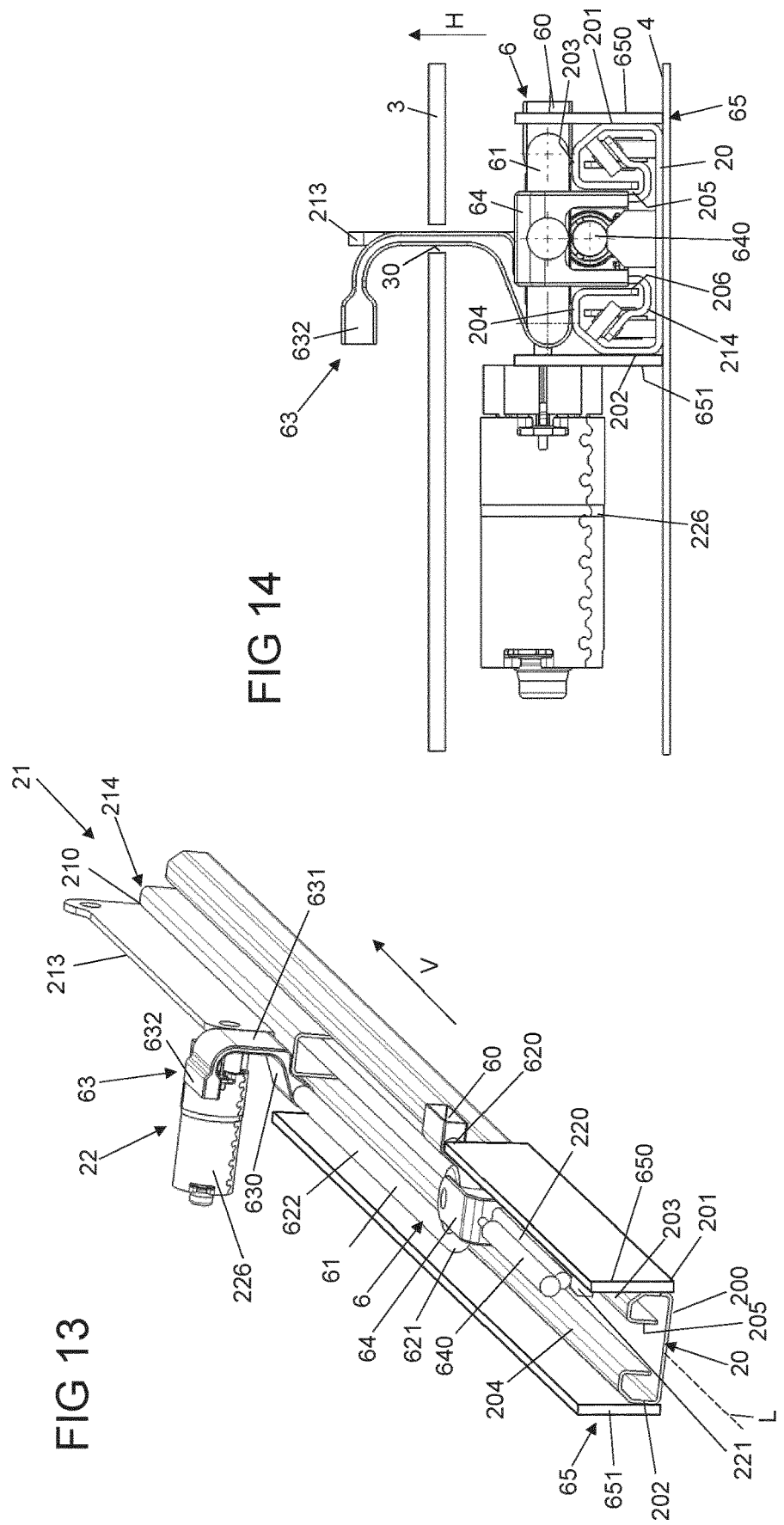
FIG. 13 is a view of yet another exemplary embodiment of an adjustment apparatus.
FIG. 14 is an end view of the arrangement according to FIG. 13.

In the case of an exemplary embodiment shown in FIGS. 13 and 14, the cable assembly 6 is formed by an electric cable 61 which, in this exemplary embodiment, is not received in a cable support device in the form of a supporting chain. In this case, the cable assembly 6 is connected by one portion 620 to a plug connector 60 and by another portion 622 to the adjusting assembly 21, in a manner similar to what has been described above.

In the exemplary embodiment shown, a curvature portion 621, which interconnects the portions 620, 622 of the cable assembly 6, is arranged on a carriage element 64 and deflected thereon. The carriage element 64 is guided in a sliding manner between the inner surfaces 205, 206 of the legs 201, 202 of the guide rail 20, and connected to a tensioning device 640, for example in the form of an elastic rubber band or a resilient spring element, and resiliently preloaded thereby along the longitudinal axis L, relative to the guide rail 20.

Owing to the tensioning device 640 occurs an adjustment of the adjusting assembly 21 in the adjustment direction V, counter to the tension of the tensioning device 640, an adjustment of the adjusting assembly 21 counter to the adjustment direction V but with relaxation of the tensioning device 640 and thus with resilient assistance of the tensioning device 640. The tensioning device 640 makes it possible to ensure that the curvature portion 621 is resiliently preloaded in the direction of the front end of the guide rail 20 in FIG. 13, and thus the cable assembly 6 is held under tension n. In particular, it is possible to cause the cable assembly 6 to move in a defined manner in the region of the curvature portion 621 upon adjustment of the adjusting assembly 21, in particular to be restored counter to the adjustment direction V, if the adjusting assembly 21 is moved counter to the adjustment direction V.

In the exemplary embodiment according to FIGS. 13 and 14, a guide device 65 is furthermore provided, which is formed by plate-shaped guide elements 650, 651 which are attached laterally with respect to the guide rail 20, as can be taken from FIGS. 13 and 14. The guide elements 650, 651 which protrude beyond the supporting portions 203, 204 of the guide rail 20 along the height direction H provide a guidance for the cable assembly 6 laterally with respect to the guide rail 60, such that the cable assembly 6 in particular cannot deviate to the side, transversely to the height direction H and transversely to the longitudinal axis L, as is also shown schematically in FIGS. 15A and 15B.

A tensioning device 640 and/or a guide device 65 comprising one or more guide elements 650, 651 can also be used in the other embodiments described above, in order to provide a resilient tension and/or lateral guidance.

The idea underlying the solution is not limited to the exemplary embodiments described above, but rather can in principle also be implemented in an entirely different way.

A vehicle functional assembly of the type described herein may for example be a vehicle seat. However, such vehicle functional assemblies may also be another functional module, for example be a console element, in particular in a vehicle inner space.

In principle one or more guide rails can be assigned to the vehicle functional assembly. In the case of future vehicle functional assemblies, for example in the form of vehicle seats, it is in particular also conceivable to arrange the vehicle functional assembly in a vehicle in a manner longitudinally adjustable only via a single guide rail, such that in this case a single guide rail on one side of the vehicle functional assembly or centrally below the vehicle functional assembly may be sufficient.

LIST OF REFERENCE CHARACTERS 1 vehicle functional assembly (vehicle seat)
10 seat part 11 backrest part
12 height adjustment apparatus
120, 121 coupling element
2 adjustment apparatus
20 guide rail
200 base
201, 202 leg
203, 204 supporting portion
205, 206 inner surfaces
21 adjusting assembly
210 base
211, 212 leg
213 attachment part
214 adjustment rail
215 opening
22 drive device
220 spindle
221 spindle retaining element
222 mechanism housing
223 spindle nut
224 drive element
225 drive shaft
226 drive motor
227 adjusting transmission
23 connecting element
3 floor portion
30 opening
4 floor assembly
5 vehicle
6 cable assembly
60 plug connector
61 cable
62 cable support device
620-622 portion
63 connection element
630 end
631 connection portion
632 plug connector
64 carriage element
640 tensioning device
65 guide device
650, 651 guide element
H height direction
H1, H2 height
L longitudinal axis
Q transverse direction
V adjustment direction

The invention claimed is:

1. An assembly of a vehicle, comprising an adjustment apparatus for longitudinal adjustment of a vehicle functional assembly, a floor assembly arranged stationary in the vehicle, and a floor portion which is arranged in the vehicle above the floor assembly, said adjustment apparatus comprising:

a guide rail longitudinally extending along a longitudinal axis, wherein the longitudinal axis is a longitudinal axis of the guide rail, and wherein the longitudinal axis of the guide rail extends parallel to a length of the vehicle;

an adjusting assembly which is adjusted on the guide rail along the longitudinal axis and is assigned to the vehicle functional assembly; and a cable assembly;

wherein the guide rail comprises a first supporting portion which extends along the longitudinal axis and a second supporting portion which extends along the longitudinal axis, wherein, as viewed along a transverse direction transversely to the longitudinal axis, the first supporting portion is arranged on a first side of a portion of the adjusting assembly and the second supporting portion is arranged on a second side of the portion of the adjusting assembly;

wherein the cable assembly comprises a first portion supported on the first supporting portion and a second portion supported on the second supporting portion;

wherein the guide rail and the cable assembly are arranged below the floor portion;

wherein the second portion is connected to a connection element;

wherein the guide rail comprises a base, a first leg extending from the base, and a second leg extending from the base, wherein the first supporting portion is formed on the first leg and the second supporting portion is formed on the second leg; and wherein the first portion rests on the first supporting portion and the second portion rests on the second supporting portion.

2. The assembly according to claim 1, wherein the cable assembly comprises an electric cable and a deformable cable support device which extends along the cable, wherein the cable support device is formed by a chain having a plurality of chain links that are movable relative to one another.

3. The assembly according to claim 2, wherein the cable support device forms the first portion and the second portion.

4. The assembly according to claim 1, wherein the first portion and the second portion are connected to one another via a curvature portion.

5. The assembly according to claim 4, wherein the curvature portion extends transversely to the longitudinal axis and the curvature portion intersects a spindle connected to the guide rail.

6. The assembly according to claim 1, wherein the first portion and the second portion extend substantially in parallel with one another along the longitudinal axis.

7. The assembly according to claim 1, wherein the length of the first portion and the length of the second portion change relative to one another when the adjusting assembly is adjusted.

8. The assembly according to claim 1, wherein the first portion is connected to a plug connector which is arranged stationary relative to the first supporting portion.

9. The assembly according to claim 1, wherein the second portion is connected to the adjusting assembly.

10. The assembly according to claim 1, wherein the cable assembly comprises a tensioning device for providing a resilient tension relative to the guide rail.

11. The assembly according to claim 1, wherein the adjustment apparatus further comprises a guide device comprising at least one guide element which extends along the longitudinal axis, along one of the supporting portions and protrudes beyond the associated supporting portion along the height direction.

12. The assembly according to claim 1, wherein the first supporting portion is arranged at a first height relative to the base, and the second supporting portion is arranged at a second height, relative to the base, that is different from the first height.

* * * * *